R. K. Hawley,
Resawing Saw.
N° 27,628. Patented Mar. 27, 1860.
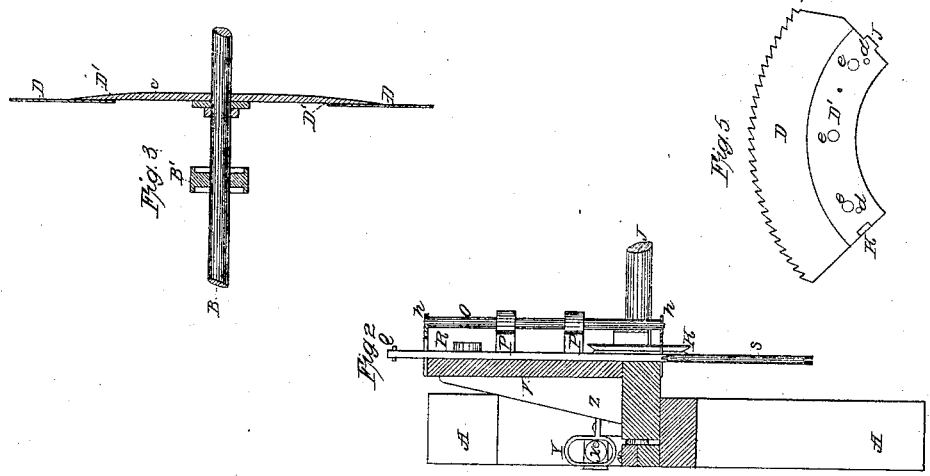
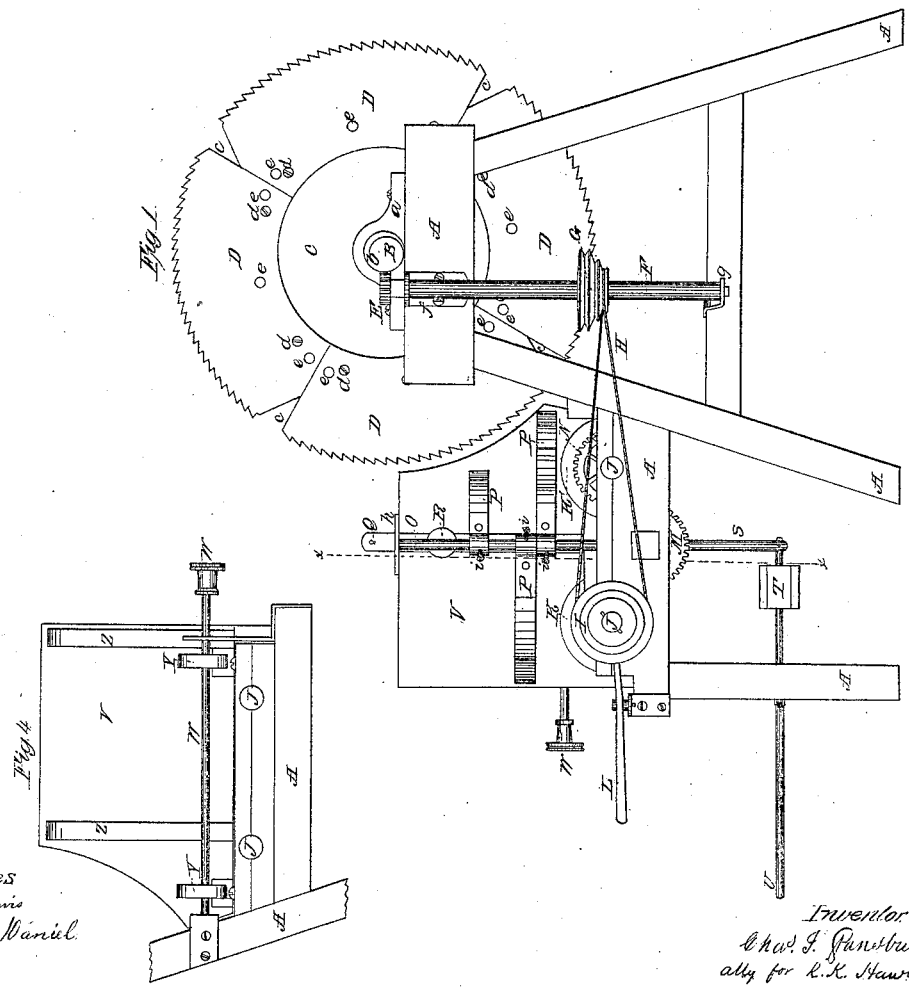
Witnesses
Grenville Lewis
William H. Daniel
Inventor
Chas. J. Lansbury
atty for R. K. Hawley

United States Patent Office.

R. K. HAWLEY, OF BALTIMORE, MARYLAND.

IMPROVED CONSTRUCTION OF CIRCULAR SAWS.

Specification forming part of Letters Patent No. 27,628, dated March 27, 1860.

*To all whom it may concern:*

Be it known that I, R. K. HAWLEY, of the city of Baltimore, in the State of Maryland, have invented certain new and useful Improvements in Circular Saws for Resawing Lumber and for Sawing Veneers; and I do hereby declare the following to be a correct description of the same, reference being had to the accompanying drawings, in which—

Figure 1 is a side elevation of my improved saw attached to a shaft and hung in a suitable mill. Fig. 2 is a vertical section through line $x\,x$ of Fig. 1. Fig. 3 is a vertical transverse section of the saw. Fig. 4 is a rear elevation of the fence, and Fig. 5 is a separate view of one of the segmental saw-plates with its back plate attached.

The same part is marked wherever it occurs by the same letter of reference.

The nature of my invention consists in improved modes of constructing the segmental blades and attaching them to each other and to the central disk or flange with which they revolve.

The objections to the circular veneer and resawing saws in common use have long been known and felt by those who have employed them and were fully pointed out in the specification of a patent for an improved circular saw, issued to me September 13, 1859, to which I beg to refer. The saw described in that specification, though a great improvement on those previously used, was open to objection on account of difficulties in its manufacture. To obviate these and to secure at the same time the advantages of the principle of construction then suggested is the main object of the present improvements.

To enable others to make and use my improvements, I will proceed to describe the construction and operation of my saw, referring to the accompanying drawings.

A stout frame A supports the boxes $a$, in which the journals of the shaft B of the saw run. The saw is attached to shaft B by a central flange or chuck C, to which the segmental blades D are fastened in the manner hereinafter set forth.

To the saw-shaft D is attached pulley B′, by which the power is applied. The saw may be described as consisting of the segmental plates D, their backing-plates D′, and the central flange C. The segmental plates are made perfectly flat and are attached to their back plates by rivets $e$. Thus united they are attached to the central flange by means of screws $d$, two such screws being sufficient for each segment. Each segment has one of its corners cut off, as shown in Fig. 5, so that when they are all attached to the flange C the V-shaped openings $c$ will be left between them. The back plate D′ of each segment has a tongue $j$ on one end and a recess $k$ on the other, the tongue of each plate fitting closely into the recess of the adjoining plate for the purpose of holding all firmly together.

If by any inaccuracy in the running or in hanging the segments of an ordinary segmental saw the periphery of one segment should not be in line with that of the adjoining one, the teeth of the segment so out of line would not follow in the kerf made by those of its predecessor, but strike on one side of it, an accident which might destroy the saw and endanger the lives of the operators. To obviate this difficulty I have left the V-shaped spaces $c$ between the segments of my saw-blade, and have so arranged the angle that the inner portion of the blade shall be the first to enter the kerf, drawing the outer portion after it, without liability to the accident above alluded to.

It will be observed that my saw is hung overhead, the board passing below the shaft—an arrangement believed to be new in veneer-sawing and attended with an immense economy of power, estimated as at least fifty per cent. and believed to surpass that proportion.

It should be observed that the object of the back plates D′ is to give to the saw the same stiffness that it would have if it were made with a thick back in the common way and reduced on the edge by grinding, while I am enabled to use a much thinner blade than is usually employed and one of uniform thickness throughout, thus securing great economy in the first cost of the saw, as well as saving of material by reason of the narrowness of the kerf.

Having thus fully described my improvements, what I claim, and desire to secure by Letters Patent, is—

A circular saw consisting of segments and backing-plates constructed and united as described and attached to the central flange, substantialy in the manner set forth.

The above specification signed and witnessed this 16th day of January, 1860.

R. K. HAWLEY.

Witnesses:
 EDM. F. BROWN,
 CHAS. F. STANSBURY.